United States Patent [19]

Vité et al.

[11] Patent Number: 4,505,883

[45] Date of Patent: Mar. 19, 1985

[54] METHOD FOR MANUFACTURING BORON-FREE SILICON DIOXIDE

[75] Inventors: Lutz Vité; Hannelore Mews, both of Munich, Fed. Rep. of Germany

[73] Assignee: Siemens Aktiengesellschaft, Berlin and Munich, Fed. Rep. of Germany

[21] Appl. No.: 555,267

[22] Filed: Nov. 25, 1983

[30] Foreign Application Priority Data

Dec. 13, 1982 [DE] Fed. Rep. of Germany ....... 3246121

[51] Int. Cl.$^3$ ............................................. C01B 33/12
[52] U.S. Cl. .................................. 423/335; 423/339; 423/341
[58] Field of Search ............... 423/335, 339, 341, 470, 423/472

[56] References Cited

U.S. PATENT DOCUMENTS

| | | |
|---|---|---|
| 3,271,107 | 9/1966 | Nickerson et al. ................... 502/232 |
| 3,592,590 | 7/1971 | Knarr .................................... 423/472 |
| 3,714,330 | 1/1973 | Barker . | |
| 3,808,309 | 4/1974 | Daiga et al. .......................... 423/339 |
| 4,247,528 | 1/1981 | Dosaj et al. .......................... 423/350 |
| 4,294,811 | 10/1981 | Aulich et al. ........................ 423/350 |

FOREIGN PATENT DOCUMENTS

| | | | |
|---|---|---|---|
| 1043301 | 11/1958 | Fed. Rep. of Germany ...... 423/335 |
| 1079016 | 4/1960 | Fed. Rep. of Germany ...... 423/341 |
| 3013319 | 10/1980 | Fed. Rep. of Germany . |

OTHER PUBLICATIONS

VPA 82 P 1128 DE (P 32 06 766.6).

*Primary Examiner*—William R. Dixon, Jr.
*Assistant Examiner*—Steven Capella
*Attorney, Agent, or Firm*—Mark H. Jay

[57] ABSTRACT

The invention provides a method for manufacturing boron-free $SiO_2$ by purification of hexafluorosilicic acid. In this case, an aqueous solution of the boron-containing hexafluorosilicic acid is transferred to the organic phase by treatment with organic compounds immiscible with water and subsequently the organic phase is converted to boron-free hexafluorosilicic acid by means of fluid-fluid extraction in the alkaline or acid medium. Particularly, complex-forming compounds, such as tri-iso-octylamine, and organic solvents, such as xylol, are used as organic compounds. The method produces $SiO_2$ with a boron content of less than 1 ppm and is usable for manufacturing silicon for solar cells.

21 Claims, No Drawings

METHOD FOR MANUFACTURING BORON-FREE SILICON DIOXIDE

BACKGROUND OF THE INVENTION

This patent application relates to a method for manufacturing boron-free silicon dioxide by purification of hexafluorosilicic acid which is suitable as a base material for manufacturing silicon for semiconductor elements, particularly for solar cells.

The basic object of the invention is to specify a method for manufacturing boron-free (less than 1 ppm) silicon dioxide using inexpensive base materials such as fluoro-silicates which makes it possible to manufacture $SiO_2$ for large-scale solar cell production.

The silicon obtained via large-scale production by means of reducing quartz ($SiO_2$) using a carbon arc is not suitable for manufacturing solar cells from a purity point of view. The low purity of technical silicon (98% Si content) partially can be traced to the highly impure quartz used for its production.

From the German patent document DE-OS No. 30 13 319, a method for manufacturing silicon suitable for solar cells is well known. A quartz of high purity obtained by mining is used for reduction with use of carbon. Although the silicon manufactured this way has a substantially higher purity than the product obtained via large-scale production, an additional purification step, e.g. a crystal pulling process according to Czochralski, is also necessary in this case to remove the impurities which affect the element's parameters.

Boron-free $SiO_2$ with a boron content of less than 1 ppm thus far could only be manufactured by means of gaseous silicon compound, such as silico-chloroform or via the glass phase; i.e. by melting the $SiO_2$ with glass-forming compounds and extracting the vitreous body. Such a method has been described in German patent document DE-OS No. 29 45 141.

A purification of hexafluorosilicic acid via pyrolysis and subsequent hydrolysis of the obtained $SiF_4$ in alkaline solution is described in German patent application No. P 32 06 766.6. With this method, the $SiF_4$ is passed through a dioxane solution prior to hydrolysis to reduce the boron content whereby the boron-tri-fluoride contained in the $SiF_4$ dissolves as ether.

SUMMARY OF THE INVENTION

The present invention solves the aforementioned problem in a different way and thus achieves a still higher purification effect and also certain simplifications are provided in the procedure as compared to the method described in the prior patent application.

It therefore involves a method of the aforementioned type, which is characterized by:

(a) the transfer of an aqueous solution with boron-containing hexafluorosilicic acid to the organic phase by treatment with organic compounds immiscible with water; and (b) the organic phase is converted to boron-free hexafluorosilicic acid by subsequent fluid-fluid extraction in the acid or alkaline medium, which is then decomposed into $SiO_2$ by known methods.

Other features and advantages of the invention will be apparent from the following description of the preferred embodiments, and from the claims.

For a full understanding of the present invention, reference should now be made to the following detailed description of the preferred embodiments of the invention.

DETAILED DESCRIPTION

In the case of the fluid-fluid extraction, the varying partition of substances between two liquid, immiscible phases is utilized for separation. The aqueous phase contains the element to be extracted, while in the organic phase, the extraction solvent is being dissolved. The element to be extracted from the aqueous solution becomes soluble by reaction with the extraction solvent in apolar liquids and thus is transferrable to the organic phase.

Further development of the invention concept provides for the use of complex-forming substances and an organic solution immiscible with water. Based on an especially favorable form of construction according to the theory of the invention a mixture of tri-isooctylamine and o-xylol is used as the complex-forming substance and organic solvent or extraction solvent. The extraction is carried out in an ammoniacal medium. In this case, it is preferred to use a 2.5 to 12.5% solution of tri-iso-octylamine in xylol.

However, it is also possible to use a chelate-forming substance instead of the complex-forming substance, whereby oxamines of the formula [R—CNOH—CNOH—R] or liquid cations or anion exchangers are used, whereby primary, secondary, tertiary and quaternary ammonium salts can be used.

The following reaction sequence results when using the complex-forming substance tri-iso-octylamine in xylol during the extraction of technical or industrial hexafluorosilicic acid ($H_2SiF_6$), which contains boron (3120 ppm = parts per million) as the fluoro complex:

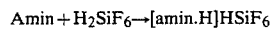

Amin + $H_2SiF_6$ → [amin.H]$HSiF_6$

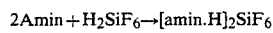

2Amin + $H_2SiF_6$ → [amin.H]$_2SiF_6$

The compound is based on the following formula

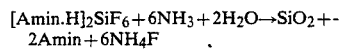

[Amin.H]$_2SiF_6$ + 6$NH_3$ + 2$H_2O$ → $SiO_2$ + 2Amin + 6$NH_4F$

By using the method according to the invention, $SiO_2$ was produced with a boron content of approx. 70 ppm, corresponding to a purification factor of 44.6 which means that after two additional extractions the originally high boron content can be reduced to approx. 35 ppb (= parts per billion).

Since the extraction mixture—tri-iso-octylamine and xylol—can be retrieved again and used for additional purification of technical $H_2SiF_6$ and both extractions can be carried out at room temperature without additional energy supply, it is possible to obtain cheap boron-free silicon in accordance with the invention.

There has thus been shown and described novel method for manufacturing boron free silicone dioxide which fulfills all the objects and advantages sought therefor. Many changes, modifications, variations and other uses and applications of the subject invention will, however, become apparent to those skilled in the art after considering this specification which discloses preferred embodiments thereof. All such changes, modifications, variations and other uses and applications which do not depart from the spirit and scope of the invention are deemed to be covered by the invention which is limited only by the claims which follow.

What is claimed is:

1. Method for manufacturing boron-free silicon dioxide which is suitable as a base material for manufacturing silicon for semiconductor elements, particularly for solar cells, by purification of hexafluorosilicic acid, said method comprising the steps of:
   (a) preparing an aqueous solution of boron-containing hexafluorosilicic acid, which acid can be transferred to an organic phase by treatment with an organic compound immiscible with water; and
   (b) converting said organic phase to boron-free hexafluorosilicic acid by subsequent fluid-fluid-extraction in an acid medium, which then is decomposed into $SiO_2$.

2. Method for manufacturing boron-free silicon dioxide which is suitable as a base material for manufacturing silicon for semiconductor elements, particularly for solar cells, by purification of hexafluorosilicic acid, said method comprising the steps of:
   (a) preparing an aqueous solution of boron-containing hexafluorosilicic acid, which acid can be transferred to an organic phase by treatment with an organic compound immiscible with water; and
   (b) converting said organic phase to boron-free hexafluorosilicic acid by subsequent fluid-fluid-extraction in an alkaline medium, which then is decomposed into $SiO_2$.

3. Method according to claim 1, wherein complex-forming compounds and organic solvents immiscible with water are used in said treatment.

4. Method according to claim 2, wherein complex-forming compounds and organic solvents immiscible with water are used in said treatment.

5. Method according to claim 1, wherein a mixture of tri-iso-octylamine and o-xylol as a complex-forming compound and organic solvent are used in said treatment and wherein said steps are carried out in an ammoniacal medium.

6. Method according to claim 2, wherein a mixture of tri-iso-octylamine and o-xylol as a complex-forming compound and organic solvent are used in said treatment and wherein said steps are carried out in an ammoniacal medium.

7. Method according to claim 3, wherein a mixture of tri-iso-octylamine and o-xylol as a complex-forming compound and organic solvent are used in said treatment and wherein said steps are carried out in an ammoniacal medium.

8. Method according to claim 4, wherein a mixture of tri-iso-octylamine and o-xylol as a complex-forming compound and organic solvent are used and wherein said steps are carried out in an ammoniacal medium.

9. Method according to claim 5, wherein a 2.5 to 12.5% solution of tri-iso-octylamine in xylol is used for acid ammoniacal medium.

10. Method according to claim 6, wherein a 2.5 to 12.5% solution of tri-iso-octylamine in xylol is used for acid ammoniacal medium.

11. Method according to claim 7, wherein a 2.5 to 12.5% solution of tri-iso-octylamine in xylol is used for acid ammoniacal medium.

12. Method according to claim 8, wherein a 2.5 to 12.5% solution of tri-iso-octylamine in xylol is used for acid ammoniacal medium.

13. Method according to claim 3, wherein chelate-forming compounds are used as said complex-forming compounds.

14. Method according to claim 4, wherein chelate-forming compounds are used as said complex-forming compounds.

15. Method according to claim 13, wherein oximes according to formula [R—CNOH—CNOH—R] as the chelate-forming compound, where R=alkyl or aryl, are used.

16. Method according to claim 14, wherein oximes according to formula [R—CNOH—CNOH—R] as the chelate-forming compound, where R=alkyl or aryl, are used.

17. Method according to claim 3, wherein a liquid cation is used as complex-forming compounds.

18. Method according to claim 4, wherein a liquid cation is used as complex-forming compounds.

19. Method according to claim 17, wherein primary, secondary, tertiary and quaternary ammonium salts are used.

20. Method according to claim 1, wherein said purification can be repeated several times to obtain more purified $SiO_2$.

21. Method according to claim 18, wherein primary, secondary, tertiary and quarternary ammonium salts are used.

* * * * *